US011416416B2

(12) United States Patent
Lai et al.

(10) Patent No.: US 11,416,416 B2
(45) Date of Patent: Aug. 16, 2022

(54) RANDOM CODE GENERATOR WITH NON-VOLATILE MEMORY

(71) Applicant: eMemory Technology Inc., Hsin-Chu (TW)

(72) Inventors: Tsung-Mu Lai, Hsinchu County (TW); Chun-Fu Lin, Hsinchu County (TW); Chun-Chieh Chao, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 462 days.

(21) Appl. No.: 16/661,012

(22) Filed: Oct. 23, 2019

(65) Prior Publication Data

US 2020/0226073 A1 Jul. 16, 2020

Related U.S. Application Data

(60) Provisional application No. 62/791,870, filed on Jan. 13, 2019.

(51) Int. Cl.
*G11C 13/00* (2006.01)
*G06F 12/14* (2006.01)
(Continued)

(52) U.S. Cl.
CPC ...... *G06F 12/1408* (2013.01); *G06F 12/1425* (2013.01); *G06F 21/79* (2013.01);
(Continued)

(58) Field of Classification Search
CPC .. G06F 12/1408; G06F 12/1425; G06F 21/79; G06F 21/73; G11C 11/1657;
(Continued)

(56) References Cited

U.S. PATENT DOCUMENTS 9,613,714 B1 * 4/2017 Wong .................. G06F 12/1408
10,020,268 B2 * 7/2018 Wong ................ H01L 27/11558
(Continued)

FOREIGN PATENT DOCUMENTS

EP 3396673 A1 10/2018
TW I631573 B 8/2018

OTHER PUBLICATIONS

Po-Hao Tseng et al, “Error free physically unclonable function with programmed resistive random access memory using reliable resistance states by specific identification-generation method”, accepted Dec. 31, 2017; published online Mar. 2, 2018, The Japan Society of Applied Physics.
(Continued)

*Primary Examiner* — Jay W. Radke
(74) *Attorney, Agent, or Firm* — WPAT, PC

(57) ABSTRACT

A random code generator includes a differential cell array, a power supply circuit, a first selecting circuit and a current judgment circuit. The power supply circuit receives an enrolling signal and a feedback signal. The first selecting circuit receives a first selecting signal. When the enrolling signal is activated and an enrollment is performed on the first differential cell, the power supply circuit provides an enrolling voltage, and the enrolling voltage is transmitted to a first storage element and a second storage element of the first differential cell through the first selecting circuit. Consequently, the cell current is generated. When a magnitude of the cell current is higher than a specified current value, the current judgment circuit activates the feedback signal, so that the power supply circuit stops providing the enrolling voltage.

10 Claims, 7 Drawing Sheets

(51) Int. Cl.

| | |
|---|---|
| ***G06F 21/79*** | (2013.01) |
| ***G11C 11/16*** | (2006.01) |
| ***G11C 11/56*** | (2006.01) |
| ***G11C 11/4074*** | (2006.01) |
| ***G11C 16/12*** | (2006.01) |
| ***G11C 16/14*** | (2006.01) |
| ***G11C 16/24*** | (2006.01) |
| ***G11C 16/26*** | (2006.01) |
| ***G11C 16/34*** | (2006.01) |
| ***G11C 7/12*** | (2006.01) |
| ***G11C 7/10*** | (2006.01) |

(52) U.S. Cl.
CPC .............. *G11C 7/1096* (2013.01); *G11C 7/12* (2013.01); *G11C 11/1657* (2013.01); *G11C 11/1673* (2013.01); *G11C 11/1697* (2013.01); *G11C 11/4074* (2013.01); *G11C 11/5642* (2013.01); *G11C 13/003* (2013.01); *G11C 13/004* (2013.01); *G11C 13/0028* (2013.01); *G11C 13/0038* (2013.01); *G11C 13/0059* (2013.01); *G11C 16/12* (2013.01); *G11C 16/14* (2013.01); *G11C 16/24* (2013.01); *G11C 16/26* (2013.01); *G11C 16/34* (2013.01); *G11C 2013/0066* (2013.01); *G11C 2013/0078* (2013.01)

(58) Field of Classification Search
CPC ............ G11C 11/1673; G11C 11/1697; G11C 11/4074; G11C 11/5642; G11C 13/0028; G11C 13/0038; G11C 13/004; G11C 16/12; G11C 16/14; G11C 16/24; G11C 16/26; G11C 16/34; G11C 7/24; G11C 16/0466; G11C 16/0483; G11C 16/10; G11C 16/30
See application file for complete search history.

(56) References Cited

U.S. PATENT DOCUMENTS

| | | | | |
|---|---|---|---|---|
| 2012/0106235 | A1* | 5/2012 | Christensen ............. | G11C 7/24 716/102 |
| 2015/0070979 | A1* | 3/2015 | Zhu ..................... | G11C 11/1695 365/158 |
| 2015/0236698 | A1* | 8/2015 | Pedersen .......... | H03K 19/00384 326/8 |
| 2018/0315460 | A1* | 11/2018 | Chen .................... | G11C 16/045 |
| 2019/0114097 | A1* | 4/2019 | Tran ...................... | G06F 3/0679 |
| 2019/0114144 | A1* | 4/2019 | Lin ......................... | G06F 7/588 |
| 2019/0369966 | A1* | 12/2019 | Hsu ....................... | H04L 9/3278 |
| 2020/0226073 | A1* | 7/2020 | Lai ......................... | G11C 16/24 |

OTHER PUBLICATIONS

Y. Yoshimoto, et al., "A ReRAM-based Physically Unclonable Function with Bit Error Rate < 0.5% after 10 years at 125° C. for 40nm embedded application", 2016, Symposium on VLSI Technology Digest of Technical Papers.
Xiaoyong Xue, et al., "A 0.13 μm 8 Mb Logic-Based Cu Si O ReRAM With Self-Adaptive Operation for Yield Enhancement and Power Reduction", May 2013, pp. 1315-1322, vol. 48, No. 5, IEEE Journal of Solid-State Circuits.
Office Action issued by Taiwan Intellectual Property Office dated Aug. 19, 2020.

* cited by examiner

RANDOM CODE GENERATOR WITH NON-VOLATILE MEMORY

This application claims the benefit of U.S. provisional application Ser. No. 62/791,870, filed Jan. 13, 2019, the subject matters of which are incorporated herein by references.

FIELD OF THE INVENTION

The present invention relates to a random code generator, and more particularly to a random code generator with a non-volatile memory.

BACKGROUND OF THE INVENTION

A physically unclonable function (PUF) technology is a novel method for protecting the data of a semiconductor chip by giving it a unclonable code. That is, the use of the PUF technology can prevent the data of the semiconductor chip from being stolen or cloned. In accordance with the PUF technology, the semiconductor chip is capable of providing a random code. This random code is used as a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the PUF semiconductor chip is suitably used in the applications with high security requirements.

Moreover, U.S. Pat. No. 9,613,714 disclosed a one time programming memory cell and a memory array for a PUF technology and an associated random code generating method. In this literature, a one time programmable memory cell and a memory array are manufactured according to the semiconductor process variation. After the program cycle, the unique random code is generated.

SUMMARY OF THE INVENTION

An embodiment of the present invention provides a random code generator. The random code generator includes a differential cell array, a power supply circuit, a first selecting circuit and a current judgment circuit. The differential cell array includes plural differential cells. A first differential cell of the plural differential cells includes a first select transistor, a first storage element and a second storage element. A first source/drain terminal of the first select transistor is connected with a first source line. A gate terminal of the first select transistor is connected with a first word line. The first storage element is connected between a second source/drain terminal of the first select transistor and a first sub-control line of a first control line pair. The second storage element is connected between the second source/drain terminal of the first select transistor and a second sub-control line of the first control line pair. The power supply circuit receives an enrolling signal and a feedback signal. The first selecting circuit receives a first selecting signal. The first selecting circuit is connected with an output terminal of the power supply circuit and the first differential cell. The current judgment circuit is used for detecting a cell current from the output terminal of the power supply circuit. When the enrolling signal is activated and an enrollment is performed on the first differential cell, the power supply circuit provides an enrolling voltage, and the enrolling voltage is transmitted to the first storage element and the second storage element of the first differential cell through the first selecting circuit. Consequently, the cell current is generated. When a magnitude of the cell current is higher than a specified current value, the current judgment circuit activates the feedback signal, so that the power supply circuit stops providing the enrolling voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
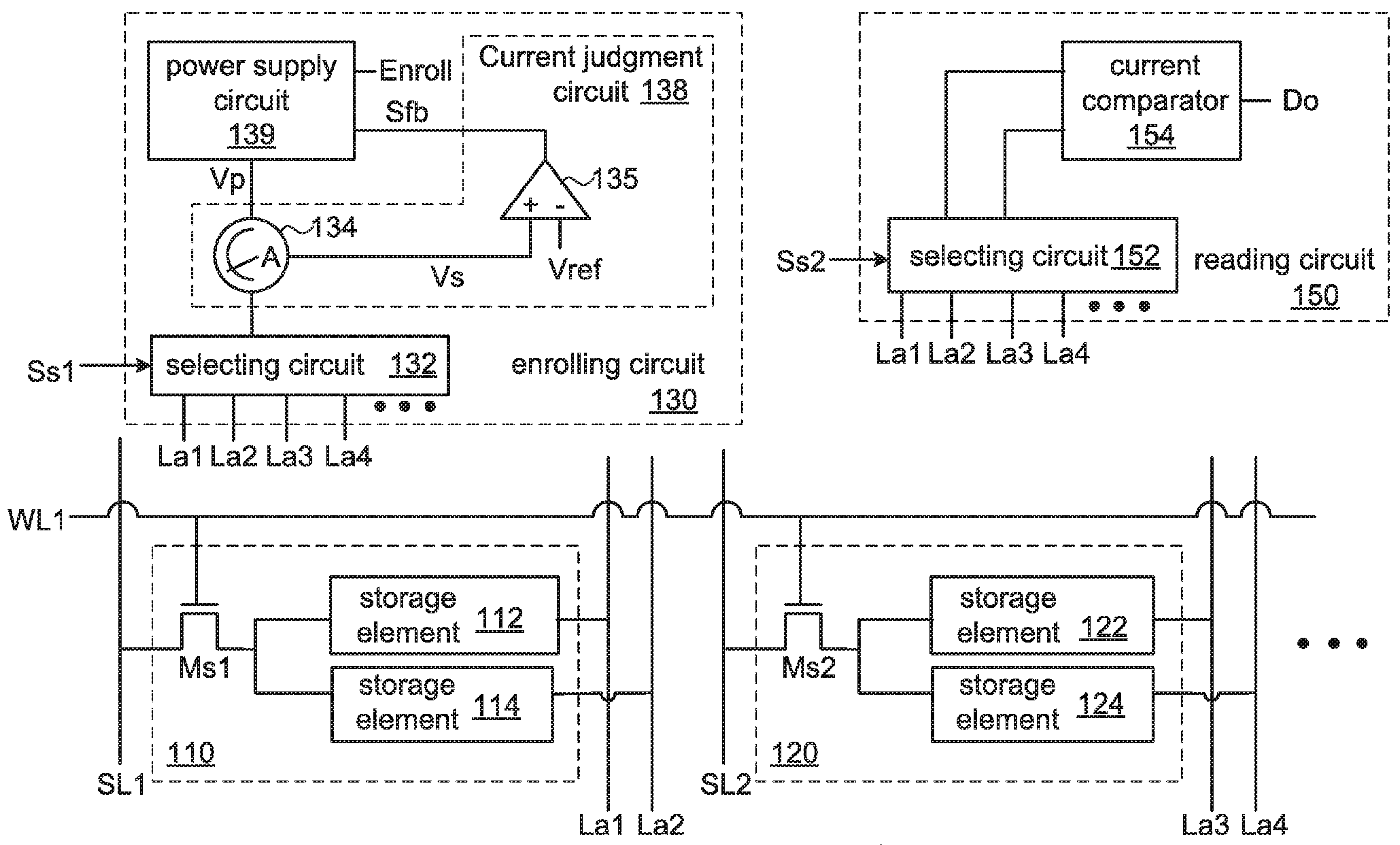
FIG. 1 is a schematic circuit diagram illustrating a random code generator according to a first embodiment of the present invention.

FIG. 1 is a schematic circuit diagram illustrating a random code generator according to a first embodiment of the present invention. As shown in FIG. 1, the random code generator comprises a differential cell array, an enrolling circuit 130 and a reading circuit 150.

The differential cell array comprises plural differential cells. For succinctness, only two differential cells 110 and 120 are shown in the drawing.

The differential cell 110 comprises a select transistor Ms1 and two storage elements 112 and 114. The gate terminal of the select transistor Ms1 is connected with a word line WL1. The first source/drain terminal of the select transistor Ms1 is connected with a source line SL1. A first terminal of the storage element 112 is connected with the second source/drain terminal of the select transistor Ms1. A second terminal of the storage element 112 is connected with a sub-control line La1 of a first control line pair. A first terminal of the storage element 114 is connected with the second source/drain terminal of the select transistor Ms1. A second terminal of the storage element 114 is connected with a sub-control line La2 of the first control line pair.

The differential cell 120 comprises a select transistor Ms2 and two storage elements 122 and 124. The gate terminal of the select transistor Ms2 is connected with a word line WL1. The first source/drain terminal of the select transistor Ms2 is connected with a source line SL2. A first terminal of the storage element 122 is connected with the second source/drain terminal of the select transistor Ms2. A second terminal of the storage element 122 is connected with a sub-control line La3 of a second control line pair. A first terminal of the storage element 124 is connected with the second source/drain terminal of the select transistor Ms2. A second terminal of the storage element 124 is connected with a sub-control line La4 of the second control line pair.

The enrolling circuit 130 comprises a selecting circuit 132, a power supply circuit 139 and a current judgment circuit 138.

The current judgment circuit 138 comprises a current detector 134 and a comparator 135. The current detector 134 is used for detecting a cell current of a selected cell and generating a corresponding detection voltage Vs. The comparator 135 receives the detection voltage Vs and a reference voltage Vref, and generates a feedback signal Sfb.

Generally, the detection voltage Vs from the current detector 134 is in direct proportion to the cell current. That is, as the cell current increases, the detection voltage Vs increases. Whereas, as the cell current decreases, the detection voltage Vs decreases. If the detection voltage Vs is higher than the reference voltage Vref, the comparator 135 activates the feedback signal Sfb.

The selecting circuit 132 is connected with the power supply circuit 139 and the sub-control lines La1, La2, La3 and La4 of all control line pairs of the differential cell array. The selecting circuit 132 determines a selected control line pair according to a selecting signal Ss1. In addition, an enrolling voltage Vp from the power supply circuit 139 is transmitted to the selected control line pair through the selecting circuit 132.

The power supply circuit 139 receives an enrolling signal Enroll and the feedback signal Sfb. During an enrolling cycle, the enrolling voltage Vp from the power supply circuit 139 is transmitted to the selected differential cell through the selecting circuit 132 and the selected control line pair. When the feedback signal Sfb is activated, the power supply circuit 139 stops providing the enrolling voltage Vp to the selected differential cell.

The reading circuit 150 comprises a selecting current 152 and a current comparator 154. During a reading cycle, the selecting current 152 connects the selected control line pair to the current comparator 154 according to a selecting signal Ss2. According to two reading currents from the selected differential cell, the current comparator 154 generates an output data Do. The output data Do is used as one bit of a random code. In an embodiment, the selecting currents 132 and 152 are multiplexers.

In an embodiment, the storage elements 112 and 114 of the differential cell 110 and the storage elements 122 and 124 of the differential cell 120 are resistive storage elements or floating gate transistors. The example of the resistive storage element includes but is not limited to a magnetoresistive random-access memory (MRAM), a phase change random-access memory (PCRAM) or a resistive random-access memory (ReRAM).

Generally, before a high voltage is received by the resistive storage element, the resistive storage element is in a high resistance state. After the resistive storage element receives a high voltage, the resistive storage element is changed to a low resistance state. Hereinafter, the operating principles of the random code generator will be illustrated by taking the resistive storage elements $R_{112}$ and $R_{114}$ as the examples of the storage elements.

Figure 2A:
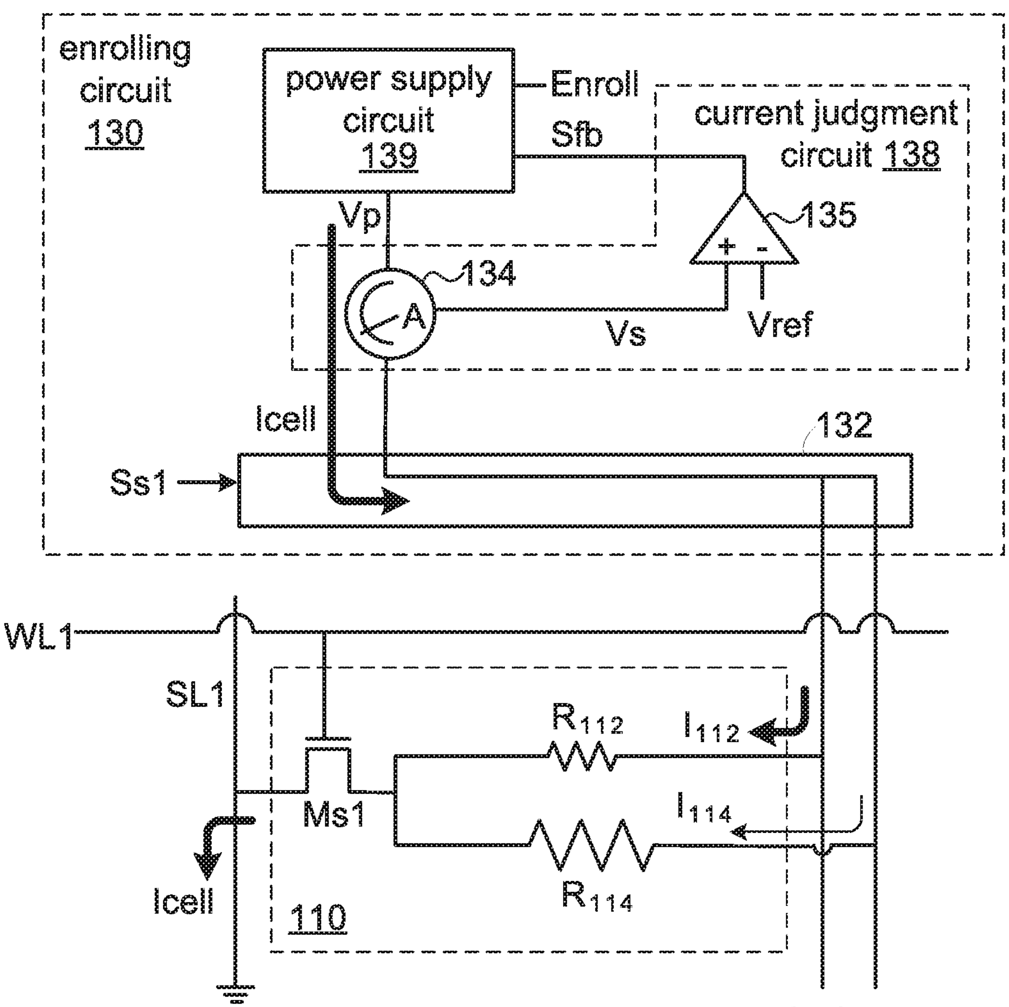
FIG. 2A is a schematic circuit diagram illustrating the operations of the random code generator according to the first embodiment of the present invention during an enrolling cycle.
Figure 2B:
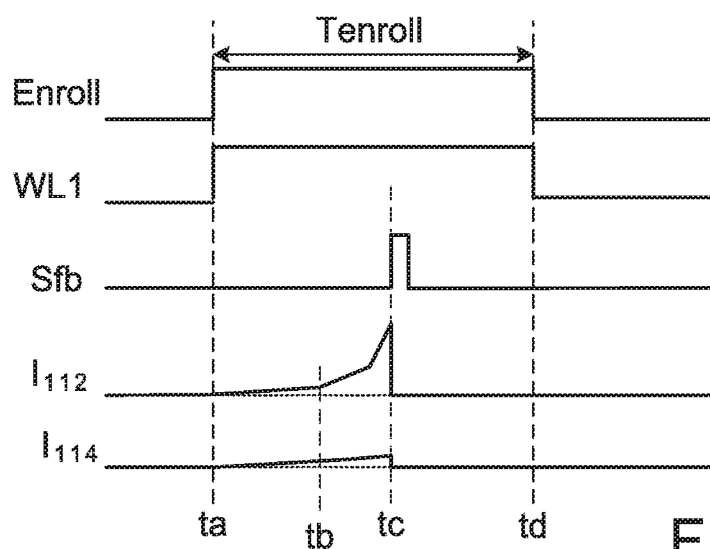
FIG. 2B is a schematic circuit diagram illustrating associated signals of the random code generator as shown in FIG. 2A.

FIG. 2A is a schematic circuit diagram illustrating the operations of the random code generator according to the first embodiment of the present invention during an enrolling cycle. FIG. 2B is a schematic circuit diagram illustrating associated signals of the random code generator as shown in FIG. 2A.

In case that the random code generator intends to perform an enrollment on the differential cell 110, the selecting circuit 132 determines a selected control line pair (La1, La2) according to the selecting signal Ss1. Consequently, the power supply circuit 139 is connected with the selected control line pair (La1, La2) through the selecting circuit 132. When the word line WL1 is activated, the select transistor Ms1 is turned on. Consequently, the differential cell 110 is the selected cell. Meanwhile, the selected cell is enrolled by the enrolling circuit 130.

Please refer to FIG. 2B. The time period between the time point ta and the time point td is an enrolling cycle Tenroll. For example, the enrolling cycle Tenroll is 1 μs. During the enrolling cycle Tenroll, the enrolling signal Enroll is in a high level state.

At the time point ta, the enrolling signal Enroll is activated. Meanwhile, the enrolling cycle is started. The enrolling voltage Vp from the power supply circuit 139 is transmitted to the selected control line pair (La1, La2) through the selecting circuit 132. Since the select transistor Ms1 is turned on and the source line SL1 is connected with a ground terminal, the resistive storage elements $R_{112}$ and $R_{114}$ receive the enrolling voltage Vp simultaneously. Since both of the resistive storage elements $R_{112}$ and $R_{114}$ are in the high resistance state, the two currents $I_{112}$ and $I_{114}$ generated by the resistive storage elements $R_{112}$ and $R_{114}$ are very low. In addition, a cell current Icell generated by the differential cell 110 is equal to the sum of the two currents $I_{112}$ and $I_{114}$. That is, $Icell=I_{112}+I_{114}$.

Due to the semiconductor process variation, a small difference between the two resistive storage elements $R_{112}$ and $R_{114}$ exists. Consequently, the time points for changing the storage states of the resistive storage elements $R_{112}$ and $R_{114}$ are different.

For example, at the time point tb, the storage state of the resistive storage element $R_{112}$ stats to be changed. Consequently, the resistance of the resistive storage element $R_{112}$ starts to be decreased and the current $I_{112}$ is gradually increased. Since the storage state of the resistive storage element $R_{114}$ is not changed at this moment, the resistance of the resistive storage element $R_{114}$ is very high and the current $I_{114}$ is very low. Meanwhile, the cell current Icell is gradually increased.

As mentioned above, the detection voltage Vs from the current detector 134 is in direct proportion to the cell current Icell. At the time point tc, the storage state of the resistive storage element $R_{112}$ is changed to the low resistance state. According to the cell current Icell, the current detector 134 generates the corresponding detection voltage Vs. Since the detection voltage Vs is higher than the reference voltage Vref, the comparator 135 activates the feedback signal Sfb. Consequently, the power supply circuit 139 stops providing the enrolling voltage Vp.

When the power supply circuit 139 stops providing the enrolling voltage Vp, the cell current Icell is no longer generated by the differential cell 110. Meanwhile, the enrollment of the differential cell 110 is completed.

Due to the semiconductor process variation, it is unable to predict which of the two resistive storage elements $R_{112}$ and $R_{114}$ of the selected differential cell has the changed storage state during the enrollment of the random code generator. Consequently, the random code generator of the present invention generates an unclonable code according to the PUF technology.

Figure 2C:
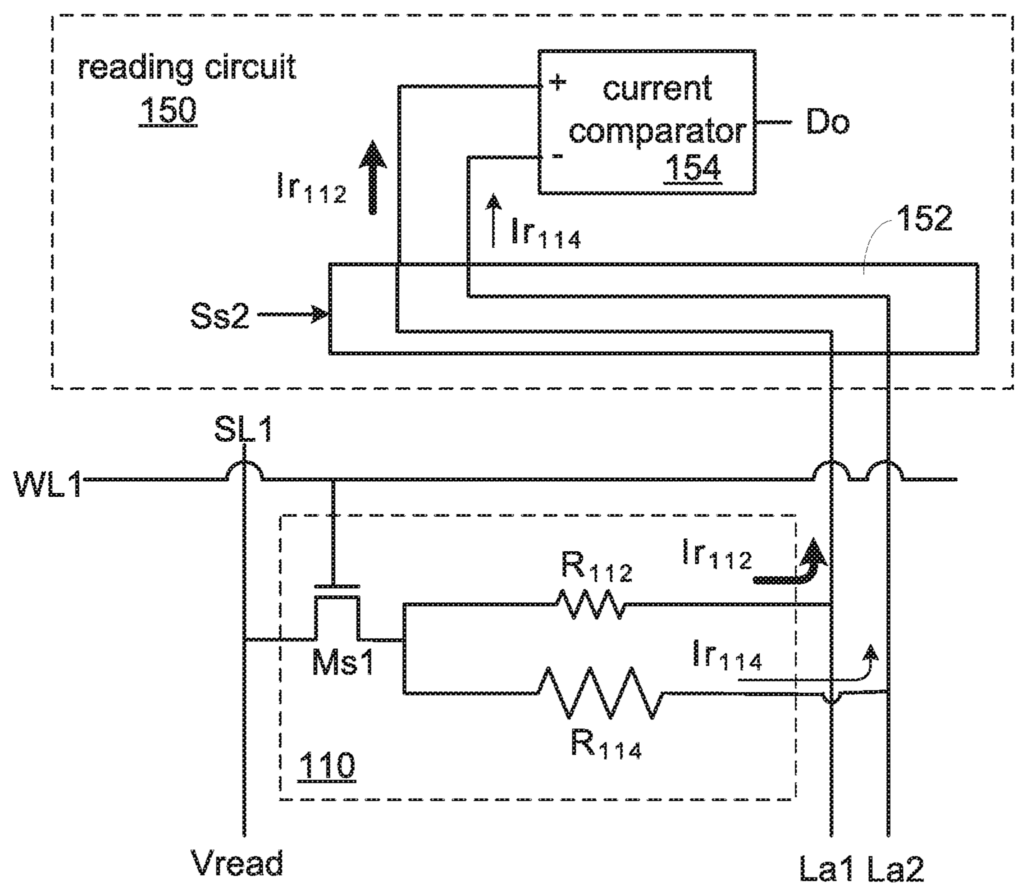
FIG. 2C is a schematic circuit diagram illustrating the operations of the random code generator according to the first embodiment of the present invention during a reading cycle.

FIG. 2C is a schematic circuit diagram illustrating the operations of the random code generator according to the first embodiment of the present invention during a reading cycle. In case that the random code generator performs a reading action on the differential cell 110, the control line pair (La1, La2) is determined as the selected control line pair according to the selecting signal Ss2. In addition, the sub-control lines La1 and La2 of the selected control line pair are connected with two input terminals of the current comparator 154 by the selecting current 152. When the word line WL1 is activated, the select transistor Ms1 is turned on. Consequently, the differential cell 110 is the selected cell. Meanwhile, the selected cell is read by the reading circuit 150.

Please refer to FIG. 2C again. During the reading cycle, the source line SL1 receives a reading voltage Vread (e.g., 0.5V). Consequently, the resistive storage elements $R_{112}$ and $R_{114}$ generate the read currents $Ir_{112}$ and $Ir_{114}$, respectively. After the enrollment, the resistive storage element $R_{112}$ is in the low resistance state, and the resistive storage element $R_{114}$ is in the high resistance state. Consequently, the read current $Ir_{112}$ is higher than the read current $Ir_{114}$. According to the read currents $Ir_{12}$ and $Ir_{14}$ from the sub-control lines La1 and La2 of the selected control line pair, the current comparator 154 generates the output data Do. For example, the output data Do has a logic value "1". The logic value "1" of the output data Do can be used as one bit of the random code.

On the other hand, if the resistive storage element $R_{112}$ is in the high resistance state, and the resistive storage element $R_{114}$ is in the low resistance state after the enrollment, the current comparator 154 generates the output data Do having a logic value "0" during the reading cycle. The logic value "0" of the output data Do can be used as one bit of the random code.

By using the above method, the random code generator may perform enrollment on plural differential cells of the differential cell array. After the reading action is performed on the plural differential cells, plural bits of a random code are obtained. For example, the random code generator performs enrollment on 8 differential cells. After the reading action is performed on the 8 differential cells, a one-byte random code is obtained.

Figure 3:
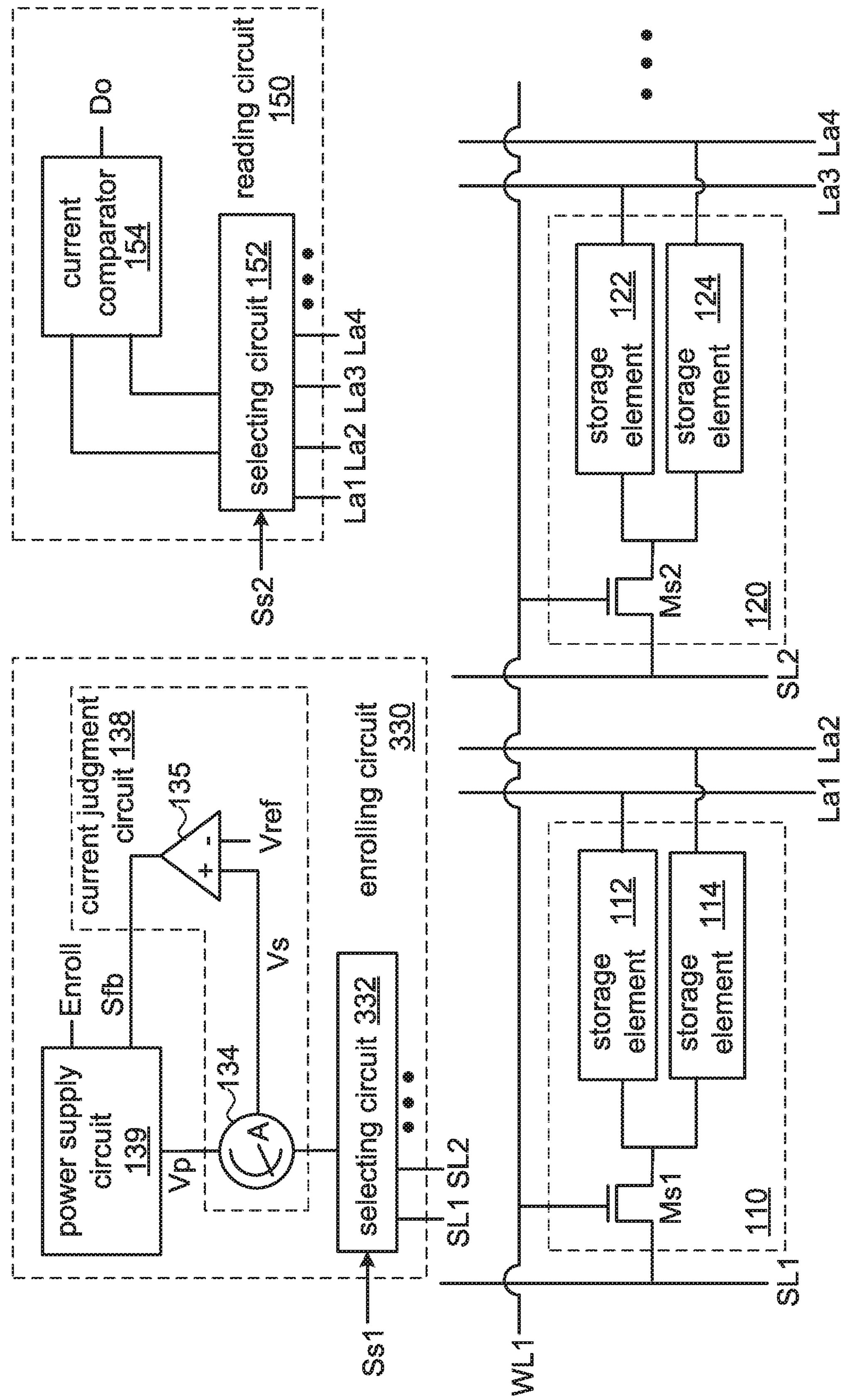
FIG. 3 is a schematic circuit diagram illustrating a random code generator according to a second embodiment of the present invention.

FIG. 3 is a schematic circuit diagram illustrating a random code generator according to a second embodiment of the present invention. In comparison with the first embodiment, the components connected with the selecting circuit 332 of the enrolling circuit 330 are distinguished. For brevity, only the connecting relationships about the selecting circuit 332 will be described as follows.

The selecting circuit 332 of the enrolling circuit 330 is connected with the power supply circuit 139 and all source lines SL1 and SL2 of the differential cell array. The selecting circuit 332 determines a selected source line according to the selecting signal Ss1. In addition, an enrolling voltage Vp from the power supply circuit 139 is transmitted to the selected source line through the selecting circuit 332.

In an embodiment, the storage elements 112 and 114 of the differential cell 110 and the storage elements 122 and 124 of the differential cell 120 are resistive storage elements or floating gate transistors. The example of the resistive storage element includes but is not limited to a magnetoresistive random-access memory (MRAM), a phase change random-access memory (PCRAM) or a resistive random-access memory (ReRAM).

Generally, after the floating gate transistor is produced, no hot carriers (e.g., electrons) are stored in the floating gate of the floating gate transistor. Consequently, the floating gate transistor is turned off, and the floating gate transistor is in a high resistance state. After the hot carriers (e.g., electrons) are injected into the floating gate of the floating gate transistor, the floating gate transistor is turned on, and the floating gate transistor is in a low resistance state. Hereinafter, the operating principles of the random code generator will be illustrated by taking the P-type floating gate transistors $M_{p122}$ and $M_{p124}$ as the examples of the storage elements.

Figure 4A:
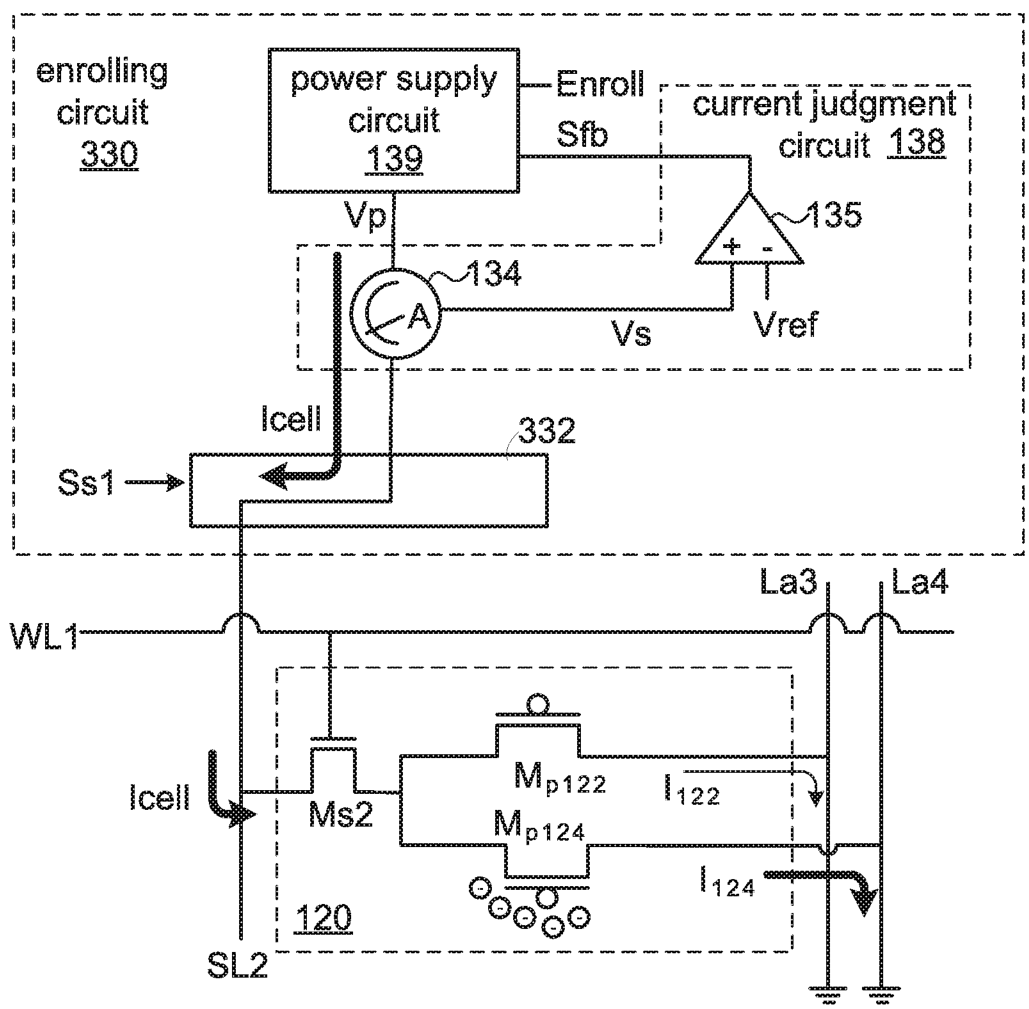
FIG. 4A is a schematic circuit diagram illustrating the operations of the random code generator according to the second embodiment of the present invention during an enrolling cycle.
Figure 4B:
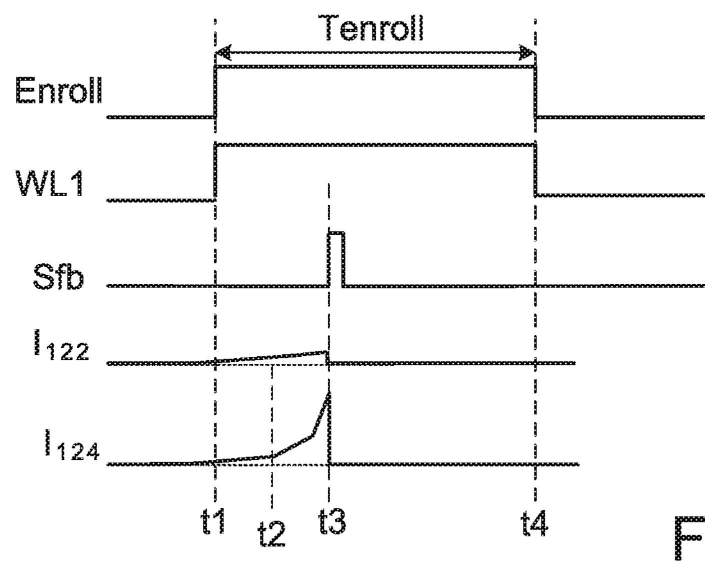
FIG. 4B is a schematic circuit diagram illustrating associated signals of the random code generator as shown in FIG. 4A.

FIG. 4A is a schematic circuit diagram illustrating the operations of the random code generator according to the second embodiment of the present invention during an enrolling cycle. FIG. 4B is a schematic circuit diagram illustrating associated signals of the random code generator as shown in FIG. 4A.

In case that the random code generator intends to perform an enrollment on the differential cell 120, the selecting circuit 332 determines the source line SL2 as the selected source line according to the selecting signal Ss1. Consequently, the power supply circuit 139 is connected with the selected source line SL2 through the selecting circuit 332. When the word line WL1 is activated, the select transistor Ms2 is turned on. Consequently, the differential cell 120 is the selected cell. Meanwhile, the selected cell is enrolled by the enrolling circuit 330.

Please refer to FIG. 4B. The time period between the time point t1 and the time point t4 is an enrolling cycle Tenroll. For example, the enrolling cycle Tenroll is 110 μs. During the enrolling cycle Tenroll, the enrolling signal Enroll is in a high level state.

At the time point t1, the enrolling signal Enroll is activated. Meanwhile, the enrolling cycle is started. The enrolling voltage Vp from the power supply circuit 139 is transmitted to the selected source line SL2 through the selecting circuit 332. Since the select transistor Ms2 is turned on and the control line pair (La3, La4) is connected with the ground terminal, the P-type floating gate transistor $M_{p122}$ and $M_{p124}$ receive the enrolling voltage Vp simultaneously. Since both of the P-type floating gate transistors $M_{p122}$ and $M_{p124}$ are in the high resistance state, the two currents $I_{122}$ and $I_{124}$ generated by the P-type floating gate transistors $M_{p122}$ and $M_{p124}$ are very low. In addition, a cell current Icell generated by the differential cell 120 is equal to the sum of the two currents $I_{122}$ and $I_{124}$. That is, $Icell=I_{122}+I_{124}$.

Due to the semiconductor process variation, a small difference between the two P-type floating gate transistors $M_{p122}$ and $M_{p124}$ exists. Consequently, the time points for changing the storage states of the P-type floating gate transistor $M_{p122}$ and $M_{p124}$ are different.

For example, at the time point t2, the storage state of the P-type floating gate transistor $M_{p124}$ stats to be changed. Meanwhile, electrons are injected into the floating gate of the P-type floating gate transistor $M_{p124}$ through a channel region of the P-type floating gate transistor $M_{p124}$. Consequently, the resistance of the P-type floating gate transistor $M_{p124}$ starts to be decreased and the current $I_{124}$ is gradually increased. Since no electrons are injected into the floating gate of the P-type floating gate transistor $M_{p122}$ at this moment, the resistance of the P-type floating gate transistor $M_{p122}$ is very high and the current $I_{122}$ is very low. Meanwhile, the cell current Icell is gradually increased.

At the time point t3, a great number of electrons have been injected into the floating gate of the P-type floating gate transistor $M_{p124}$, the P-type floating gate transistor $M_{p124}$ is turned on and the storage state of the P-type floating gate transistor $M_{p124}$ is changed to the low resistance state. According to the cell current Icell, the current detector 134 generates the corresponding detection voltage Vs. Since the detection voltage Vs is higher than the reference voltage Vref, the comparator 135 activates the feedback signal Sfb. Consequently, the power supply circuit 139 stops providing the enrolling voltage Vp.

When the power supply circuit 139 stops providing the enrolling voltage Vp, the cell current Icell is no longer generated by the differential cell 110. Meanwhile, the enrollment of the differential cell 120 is completed.

Due to the semiconductor process variation, it is unable to realize which of the two P-type floating gate transistors $M_{p122}$ and $M_{p124}$ of the selected differential cell has the changed storage state during the enrollment of the random code generator. Consequently, the random code generator of the present invention generates the random code according to the PUF technology.

Figure 4C:
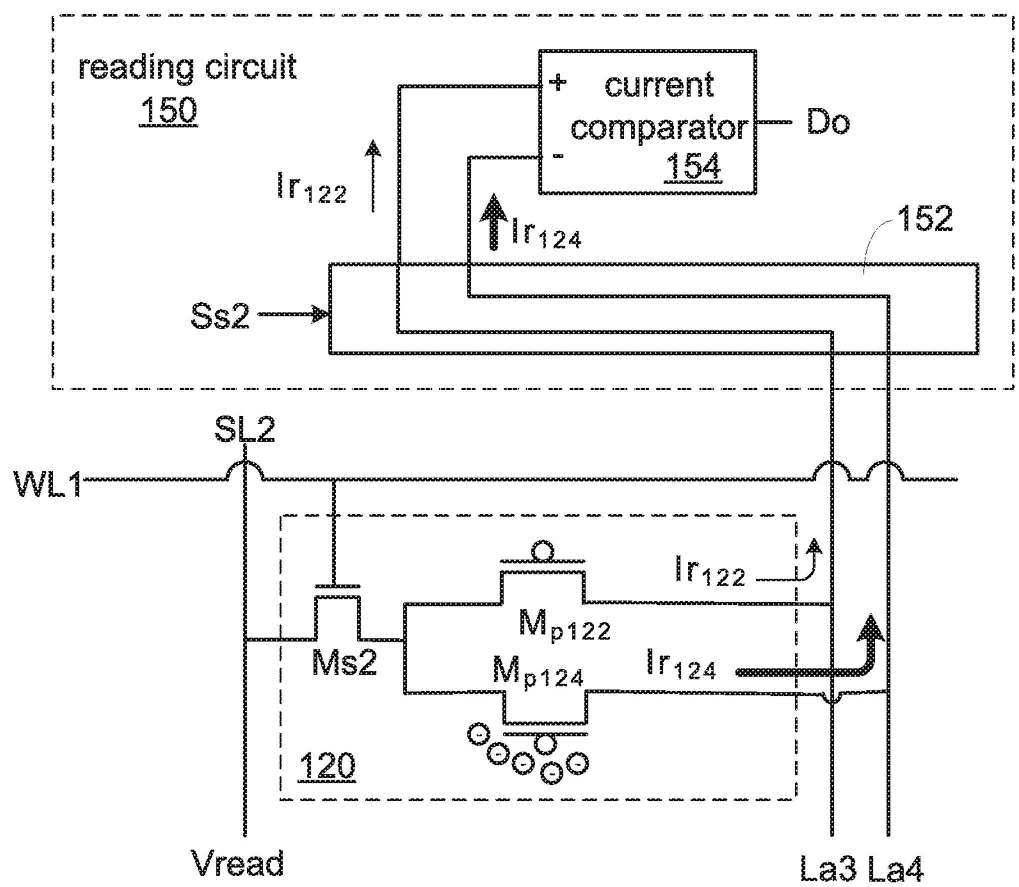
FIG. 4C is a schematic circuit diagram illustrating the operations of the random code generator according to the second embodiment of the present invention during a reading cycle.

FIG. 4C is a schematic circuit diagram illustrating the operations of the random code generator according to the second embodiment of the present invention during a reading cycle. In case that the random code generator performs a reading action on the differential cell 120, the control line pair (La3, La4) is determined as the selected control line pair according to the selecting signal Ss2. In addition, the sub-control lines La3 and La4 of the selected control line pair are connected with two input terminals of the current comparator 154 by the selecting current 152. When the word line WL1 is activated, the select transistor Ms2 is turned on. Consequently, the differential cell 120 is the selected cell. Meanwhile, the selected cell is read by the reading circuit 150.

Please refer to FIG. 4C again. During the reading cycle, the source line SL2 receives a reading voltage Vread (e.g., 1.0V). Consequently, the P-type floating gate transistors $M_{p122}$ and $M_{p124}$ generate the read currents $Ir_{122}$ and $Ir_{124}$, respectively. After the enrollment, the P-type floating gate transistors $M_{p124}$ is in the low resistance state, and the P-type floating gate transistors $M_{p122}$ is in the high resistance state. Consequently, the read current $Ir_{124}$ is higher than the read current $Ir_{122}$. According to the read currents $Ir_{122}$ and $Ir_{124}$ from the sub-control lines La3 and La4 of the selected control line pair, the current comparator 154 generates the output data Do. For example, the output data Do has a logic value "0". The logic value "0" of the output data Do can be used as one bit of the random code.

On the other hand, if the P-type floating gate transistors $M_{p124}$ is in the high resistance state, and the P-type floating gate transistors $M_{p122}$ is in the low resistance state after the enrollment, the current comparator 154 generates the output data Do having a logic value "1" during the reading cycle. The logic value "1" of the output data Do can be used as one bit of the random code.

Figure 5:
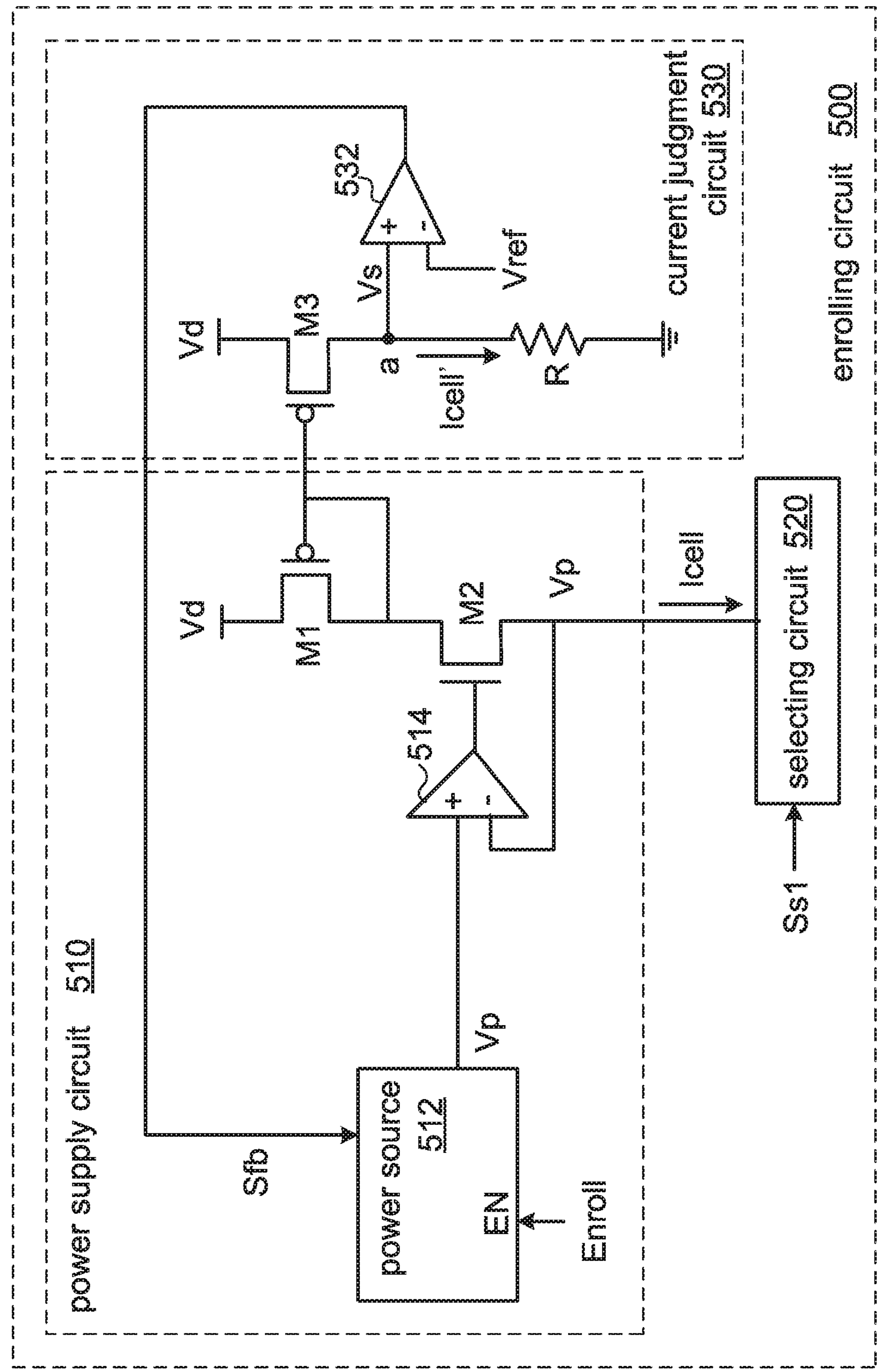
FIG. 5 is a schematic circuit diagram illustrating an exemplary enrolling circuit of the random code generator according to an embodiment of the present invention.

FIG. 5 is a schematic circuit diagram illustrating an exemplary enrolling circuit of the random code generator according to an embodiment of the present invention. The enrolling circuit 500 comprises a selecting circuit 520, a power supply circuit 510 and a current judgment circuit 530.

The power supply circuit 510 comprises a power source 512, an operational amplifier (OP) 514, and two transistors M1, M2. The power source 512 includes a voltage output terminal connected to a positive input terminal of the operational amplifier 514. Moreover, an enabling terminal EN of the power source 512 receives the enrolling signal Enroll and a feedback terminal of the power source 512 receives a feedback signal Sfb. When the enrolling signal Enroll is in the high level state, the power source 512 is enabled to generate the enrolling voltage Vp to the positive input terminal of the operational amplifier 514. Furthermore, when the feedback signal Sfb is activated, the power source 512 stops providing the enrolling voltage Vp. For example, when the feedback signal Sfb is activated, the voltage output terminal of the power source 512 provides a ground voltage (0V) to the positive input terminal of the operational amplifier 514.

The source terminal of the transistor M1 receives a power voltage Vd. The gate terminal and the drain terminal of the transistor M1 are connected with each other. The drain terminal of the transistor M2 is connected with the drain terminal of the transistor M1. The gate terminal of the transistor M2 is connected with an output terminal of the operational amplifier 514. A source terminal of the transistor M2 is connected with a negative input terminal of the operational amplifier 514. The source terminal of the transistor M2 is used as an output terminal of the power supply circuit 510, and connected with the selecting circuit 520.

The current judgment circuit 530 comprises a transistor M3, a comparator 532 and a resistor R. The gate terminal of the transistor M3 is connected with the gate terminal of the transistor M1 of the power supply circuit 510. The source terminal of the transistor M3 receives the power voltage Vd. The drain terminal of the transistor M3 is connected to the node "a". The gate terminal of the resistor R is connected between the node "a" and the ground terminal. The positive input terminal of the comparator 532 is connected with the node "a". The negative input terminal of the comparator 532 receives the reference voltage Vref. The output terminal of the comparator 532 generates the feedback signal Sfb.

For example, the selecting circuit 520 is a multiplexer. In case that the selecting circuit 520 is applied to the random code generator of the first embodiment, the enrolling voltage Vp from the power supply circuit 510 is transmitted to the selected control line pair through the selecting circuit 520 according to the selecting signal Ss1. In case that the selecting circuit 520 is applied to the random code generator of the second embodiment, the enrolling voltage Vp from the power supply circuit 510 is transmitted to the selected source line through the selecting circuit 520 according to the selecting signal Ss1.

During the enrolling cycle, the enrolling signal Enroll is in the high level state. Consequently, the enrolling voltage Vp is outputted from the power source 512. Moreover, the feedback signal Sfb is in the low level state that means the feedback signal Sfb is not activated. Consequently, the positive input terminal of the operational amplifier 514 to receive the enrolling voltage Vp, and the enrolling voltage Vp is outputted from the output terminal of the power supply circuit 510. When the selecting circuit 520 is connected with the selected cell, the output terminal of the power supply circuit 510 generates the cell current Icell.

Moreover, the transistors M1 and M3 are connected with each other to form a current mirror. Consequently, the transistor M3 generates a mirror current Icell'. The mirror current Icell' flows through the resistor R. As the cell current Icell increases, the mirror current Icell' also increases. Consequently, the detected voltage Vs at the node "a" increases. When the detected voltage Vs at the node "a" reaches the reference voltage vref, the comparator 532 activates the feedback signal Sfb. Meanwhile, the power supply circuit 510 stops providing the enrolling voltage Vp to the selected differential cell, and the enrollment is completed.

From the above descriptions, the present invention provides a random code generator. During the enrollment, the unpredictable storage state is generated according to the small difference between the two storage elements of the differential cell. Consequently, during the reading cycle, the storage state of the differential cell is verified and used as one bit of the random code.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generator, comprising:

a differential cell array comprising plural differential cells, wherein a first differential cell of the plural differential cells comprises a first select transistor, a first storage element and a second storage element, wherein a first source/drain terminal of the first select transistor is connected with a first source line, a gate terminal of the first select transistor is connected with a first word line, the first storage element is connected between a second source/drain terminal of the first select transistor and a first sub-control line of a first control line pair, and the second storage element is connected between the second source/drain terminal of the first select transistor and a second sub-control line of the first control line pair;

a power supply circuit receiving an enrolling signal and a feedback signal;

a first selecting circuit receiving a first selecting signal, wherein the first selecting circuit is connected with an output terminal of the power supply circuit and the first differential cell; and a current judgment circuit for detecting a cell current from the output terminal of the power supply circuit, wherein when the enrolling signal is activated and an enrollment is performed on the first differential cell, the power supply circuit provides an enrolling voltage, and the enrolling voltage is transmitted to the first storage element and the second storage element of the first differential cell through the first selecting circuit, so that the cell current is generated, wherein when a magnitude of the cell current is higher than a specified current value, the current judgment circuit activates the feedback signal, so that the power supply circuit stops providing the enrolling voltage.

2. The random code generator as claimed in claim 1, wherein the random code generator further comprises a reading circuit, and the reading circuit is connected with the first sub-control line and the second sub-control line of the first control line pair, wherein during a reading cycle, a reading voltage is provided to the first storage element and the second storage element and a reading action is performed on the first differential cell, so that a first reading current and a second reading current are respectively generated by the first storage element and the second storage element, wherein the first reading current and the second reading current are transmitted to the reading circuit through the first sub-control line and the second sub-control line, respectively, wherein the reading circuit generates an output data according to the first reading current and the second reading current, and the output data is used as one bit of a random code.

3. The random code generator as claimed in claim 2, wherein the reading circuit comprises:

a current comparator having a first current input terminal and a second current input terminal; and a second selecting circuit connected with the first sub-control line, the second sub-control line, the first current input terminal and the second current input terminal, wherein during the reading cycle, the reading voltage is provided to the first source line and the reading action is performed on the first differential cell, wherein the current comparator connects the first sub-control line to the first current input terminal and connects the second sub-control line to the second current input terminal according to a second selecting signal, wherein the current comparator generates the output data according to the first reading current and the second reading current, and the output data is used as the one bit of the random code.

4. The random code generator as claimed in claim 2, wherein the first selecting circuit is connected with the first control line pair, wherein when the enrolling signal is activated and the enrollment is performed on the first differential cell, the first source line is connected with a ground terminal, and the first selecting circuit connects the output terminal of the power supply circuit to the first control line pair according to the first selecting signal, so that the first control line pair generates the cell current.

5. The random code generator as claimed in claim 2, wherein the first selecting circuit is connected with the first source line, wherein when the enrolling signal is activated and the enrollment is performed on the first differential cell, the first control line pair is connected with a ground terminal, and the first selecting circuit connects the output terminal of the power supply circuit to the first source line according to the first selecting signal, so that the first control line pair generates the cell current.

6. The random code generator as claimed in claim 1, wherein the power supply circuit comprises:

a power source having an enabling terminal to receive the enrolling signal and a feedback terminal to receive the feedback signal, wherein when the enrolling signal is activated, a voltage output terminal of the power source provides the enrolling voltage, wherein when the feedback signal is activated, the voltage output terminal of the power source stops providing the enrolling voltage;

an operational amplifier, wherein a positive input terminal of the operational amplifier is connected with the voltage output terminal of the power source;

a first transistor, wherein a source terminal of the first transistor receives a power voltage; and a second transistor, wherein a drain terminal of the second transistor is connected with a gate terminal and a drain terminal of the first transistor, a gate terminal of the second transistor is connected with an output terminal of the operational amplifier, and a source terminal of the second transistor is connected with a negative input terminal of the operational amplifier, wherein the source terminal of the second transistor is connected with the first selecting circuit.

7. The random code generator as claimed in claim 6, wherein the current judgment circuit comprises:

a third transistor, wherein a source terminal of the third transistor receives the power voltage, and a gate terminal of the third transistor is connected with the gate terminal of the first transistor;

a resistor connected between a drain terminal of the third transistor and a ground terminal; and a comparator, wherein a first input terminal of the comparator is connected with the drain terminal of the third transistor, a second input terminal of the comparator receives a reference voltage, and an output terminal of the comparator generates the feedback signal.

8. The random code generator as claimed in claim 1, wherein the first storage element is a first resistive storage element, and the second storage element is a second resistive storage element.

9. The random code generator as claimed in claim 8, wherein the first resistive storage element and the second resistive storage element are magnetoresistive random-access memories, phase change random-access memories or resistive random-access memories.

10. The random code generator as claimed in claim 1, wherein the first storage element is a first P-type floating gate transistor, and the second storage element is a second P-type floating gate transistor.

* * * * *